Feb. 6, 1968   W. VOLKMANN   3,368,138
THYRISTOR CONTROL SYSTEM FOR SUPPLYING RECTIFIED VOLTAGE
FROM A THREE-PHASE ALTERNATING-CURRENT SUPPLY
Filed Oct. 30, 1964

United States Patent Office 3,368,138
Patented Feb. 6, 1968

3,368,138
THYRISTOR CONTROL SYSTEM FOR SUPPLYING RECTIFIED VOLTAGE FROM A THREE-PHASE ALTERNATING-CURRENT SUPPLY
Werner Volkmann, Munich, Germany, assignor to Siemens-Schuckertwerke Aktiengesellschaft, Berlin-Siemensstadt and Erlangen, Germany, a corporation of Germany
Filed Oct. 30, 1964, Ser. No. 407,655
Claims priority, application Germany, Oct. 31, 1963, S 88,112
6 Claims. (Cl. 322—72)

ABSTRACT OF THE DISCLOSURE

A main thyristor having a main path in series connection in the load circuit of a three-phase alternating voltage feeder is intermittently fired by a trigger circuit. A commutating capacitor and an auxiliary thyristor are connected in series with each other between the load side of the main thyristor and one phase of the alternating voltage feeder for extinguishing the main thyristor. The auxiliary thyristor is fired by a trigger circuit in order to extinguish the main thyristor. A diode connects the capacitor with another one of the feeder phases whereby the capacitor is charged by the phase voltage between the feeder phases.

Figure 1:
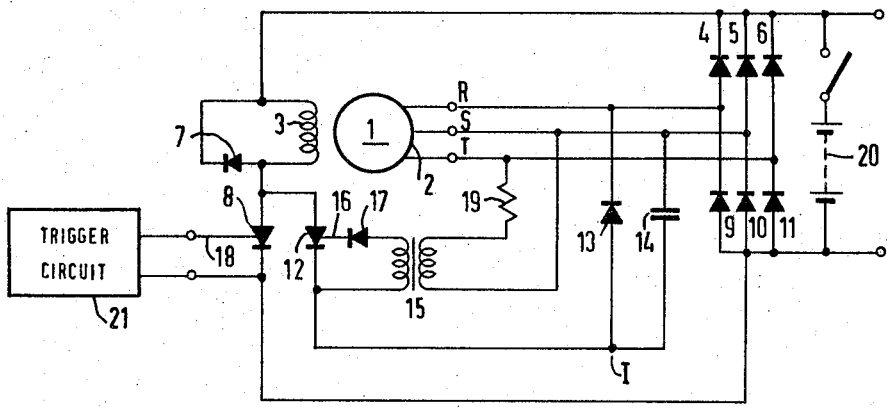

My invention relates to control systems of the discontinuous or on-off type operating with semiconductor controlled rectifiers or similar semiconductor latching switches, generally called thyristors. Such thyristors, operating like the known gas-filled controllable rectifier tubes (thyratrons), tend to block the applied voltage independently of its polarity. After a thyristor is "fired," its resistance is very low-ohmic. Hence, once the thyristor is turned on, assuming the feeder voltage across its load path has the suitable polarity, it conducts a current determined essentially only by the magnitude of the feeder voltage and the impedance of the load. Thereafter, the thyristor can return to blocking condition only when the load current decreases below a critical value near zero, the so-called holding current. On account of this behavior, a thyristor cannot alone be used as a switch for the control of direct currents because, once fired, the thyristor could not be turned off. It has become known, therefore, to connect a commutating capacitor through an auxiliary thyristor in a direct-current circuit parallel to the load path of the switching thyristor, so as to charge the capacitor. By firing the auxiliary thyristor, the capacitor is discharged through the load path of the main thyristor in opposition to the load current so as to compensate it down to below the holding value, thus causing the main thyristor to turn off.

Difficulties have been encountered in on-off control systems of this type, due to the fact that, during the sometimes very short current-conducting intervals of the main thyristor, the auxiliary transistor is not always charged up to the voltage value required for proper performance. This tends to become particularly aggravated or serious in control systems requiring a rapid response for the purpose of varying or regulating a direct current supplied by rectification from an alternating-current supply.

It is an object of my invention to eliminate the above-mentioned difficulties, especially in control or regulating systems wherein a main thyristor, connected between a direct-voltage source and a load, is periodically fired and periodically turned off with the aid of a commutating capacitor controlled by an auxiliary thyristor, and where-in the direct-voltage source is a rectifier energized from a three-phase alternating-voltage feeder line.

Another, more specific object of the invention is to design the commutating circuit in a thyristor control system of the type mentioned, so that the commutating capacitor, at the firing moments of the auxiliary thyristor, always contains a charge sufficient for extinguishing the main thyristor.

Another object of the invention is to simplify the turn-off circuitry in such a system by minimizing or virtually eliminating the need for additional circuit components to take care of discharging the commutating capacitor.

To achieve these objects, and in accordance with a feature of my invention, the load terminal with which the main thyristor is connected, is also connected through the auxiliary thyristor and through the commutating capacitor with one of the three phase leads of the alternating-voltage line which energizes the rectifier that supplies direct current to the load circuit. Furthermore, the commutating capacitor is connected through a diode with another phase load of the same alternating-voltage feeder line, the diode being so poled that the electrode of the capacitor connected with the auxiliary thyristor is charged to a negative potential.

According to another feature of the invention, the trigger pulses for controlling the auxiliary thyristor are preferably produced in a pulse-generating circuit which comprises a saturable transformer whose primary winding is connected between two of the three phase leads (R, S, T) of the alternating-voltage feeder line. For example, when the commutating capacitor is connected, on the one hand, directly to the phase S and on the other hand through the diode to the phase R, then the primary winding of the saturable transformer is to be connected between the phases S and T.

According to a further feature of the invention, the above-described system is particularly advantageous for regulating the voltage of a three-phase alternator to whose output terminals a three-phase bridge network of rectifiers is connected for supplying rectified current to the load circuit, the excitation winding of the generator being shunted by a free-wheeling diode (also called "zero anode") and constituting the load in the direct-current load circuit of the rectifier in series with the main thyristor.

Figure 2:
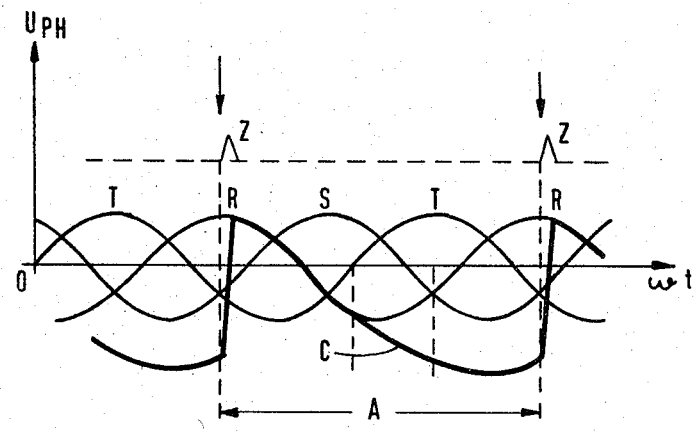

An embodiment of the invention exemplifying a generator control system of the latter type is illustrated by way of example in the accompanying drawing, in which:

FIG. 1 shows a schematic circuit diagram of the generator control system of the present invention; and FIG. 2 is a graph explanatory of the system performance. The potentials of the alternator, referred to herein are with reference to the neutral point or lead (not shown in the figures, but corresponding to the abscissa of FIG. 2) of said alternator.

The illustrated system is shown equipped with a three-phase alternator 1 whose armature 2 has three alternating-current output terminals R, S, T. The excitation winding 3 of the alternator constitutes the direct-current load of the system. It will be understood that either the armature or the excitation winding may constitute the rotor of the alternator in the conventional manner. A three-phase rectifier bridge network of diodes 4, 5, 6 and 9, 10, 11 is connected to the three-phase terminals R, S, T to supply rectified voltage to a direct-current line. It is assumed that the alternator is driven at greatly varying speed and in changing directions, as is the case, for example, when the alternator is mounted on a vehicle and coupled with a running-wheel axle thereof. The particular embodiment shown is equipped with a storage battery 20 which, when connected by a switch between the positive and negative output leads of the rectifier bridge, is to be charged therefrom. It is desired to maintain the three-phase alternating voltage, and consequently the rectified voltage, substantially constant regardless of changes in alternator speed. The illustrated control system is capable of securing such performance.

A diode 7 poled in inverse relation to the forward direction of the rectified direct current, is shunt-connected to the excitation winding 3 to serve as a free-wheeling diode. A main thyristor 8, having a gate electrode lead 18, has its main path serially connected in the direct-current load circuit. The addition of the free-wheeling diode 7 is needed for maintaining, after the thyristor 8 is turned off, a flow of self-inductance current through the excitation winding 3. Without the diode 7, the inductance winding 3 would cause a holding current to flow through the thyristor 8 and prevent commutation and complete turnoff. Turnoff of thyristor 8 is effected by means of an auxiliary direct-current circuit which comprises an auxiliary thyristor 12 which has one side connected through a diode 13 to the alternating-current terminal R and also through a commutating capacitor 14 to the alternating-current terminal S. The other side of the auxiliary thyristor 12 is connected to the positive electrode of the main thyristor 8 and to the excitation winding 3.

The auxiliary thyristor 12 is fired under control by a pulse generating circuit which, preferably, and as shown, comprises a saturable transformer 15 whose primary winding has one end connected to the alternating-current terminal S, the other side being connected through a resistor 19 to the terminal T. The gate electrode 16 of the auxiliary thyristor 12 is connected through a diode 17 to the secondary winding of the transformer 15. Consequently the phase voltage derived from terminals S and T is utilized as an auxiliary alternating voltage.

As soon as the main thyristor 8 has fired, the excitation winding 3 is traversed by rectified direct current until the thyristor 8 is turned off.

This is effected by the functioning of the capacitor 14 connected through the diode 13 between the phases S and R of the alternating-voltage feeder terminals. As long as the potential of feeder terminal S in the positive direction is higher than the potential of terminal R, the capacitor 14 is charged. When the voltage difference between terminals R and S changes its direction, the capacitor 14 is prevented from discharging by the blocking action of the diode 13.

The variable potential at the lower electrode of the commutating capacitor 14 and hence at point I in FIG. 1 is graphically illustrated in FIG. 2 in which the abscissa denotes time and the ordinate denotes electrical angles $\omega t$. The time curves of the phase voltages or phase potentials R, S and T are denoted by the same letters R, S and T respectively. A heavy-line curve C represents the time curve of the potential at point I. This potential follows the course of curve R up to the intersection of curves R and S. From then on, the capacitor 14 is charged until the voltage difference between R and S increases. As soon as this voltage difference commences to decrease, the discharge of the capacitor is blocked so that the capacitor remains virtually fully charged, while the potential at point I changes in approximate parallel relation to curve S.

In this manner, the point I receives a negative potential corresponding approximately to twice the phase voltage or phase potential.

By firing of the auxiliary thyristor 12, this potential of point I is applied to the opposite side of the main thyristor 8, thus temporarily compensating the load current and turning the thyristor 8 off. That is, at the time instant Z of firing, the voltage of the capacitor 14, in addition to the phase voltage between the terminals R and S, is applied to the auxiliary thyristor 12. This is approximately twice the phase voltage of the alternator. At the same time instant Z, the auxiliary thyristor 12 is fired and the phase voltage between the terminals R and T is applied to the thyristor 8. The phase voltage applied to the thyristor 8 is smaller than that applied to the auxiliary thyristor 12. The current flowing through the main thyristor 8 thus also flows through the auxiliary thyristor 12 so that the holding current of the thyristor 8 decreases in magnitude below the threshold value and blocks said main thyristor.

It will be understood that the auxiliary thyristor 12 is fired by an auxiliary alternating voltage provided with the aid of the saturable transformer 15. Due to the saturation properties of the transformer, a voltage is induced in the transformer secondary winding only until the transformer core reaches saturation. Consequently, the secondary winding furnishes, immediately subsequent to each zero passage, a certain increase in voltage until saturation is reached, whereafter the voltage breaks down. This results in the issuance of voltage peaks substantially in the form of spikes Z as shown schematically in FIG. 2. However, the diode 17 passes only each second voltage spike to the gate electrode 16 of the auxiliary thyristor 12.

After turnoff of the auxiliary thyristor 12, the capacitor 14 is again charged until the voltage at point I rises nearly up to the voltage of phase R. Then the current again passes to the diode 7. Since the threshold values of the series connected diodes 4, 5 or 6, as well as 12 and 13, together are higher then the threshold value of the free-wheeling diode 7, the auxiliary thyristor 12 is turned off. The firing angle is indicated by the interval A in FIG. 2.

The novel control system does not require the provision of additional discharging components for the commutating capacitor because the auxiliary voltage secures a gradual recharge. This results in a desirable simplification.

The firing pulses for the gate electrode 18 of the main thyristor 8 are supplied by any suitable trigger circuit 21 of which various configurations are well known and available in the art. It will be understood that for regulating the rectified voltage, a feedback connection between the direct-current output leads and the trigger circuit is necessary in order to compare the actual direct voltage with an adjusted reference voltage so that the trigger circuit will operate in dependence upon the error voltage constituted by the departure of the actual voltage from the reference voltage. Since trigger circuits and feedback connections of this type are commonly known, for example from the handbooks issued by thyristor or SCR manufacturers, they are not illustrated in the drawing. If desired, however, the particular trigger and feedback circuit illustrated and described in the copending application of H. Poppinger, Ser. No. 396,950, filed Sept. 16, 1964 may be used to advantage for the purposes of the present invention.

As indicated in the disclosure of the copending application, as shown in FIG. 1 thereof, a battery is connected to both bus lines which are energized by a generator through a full wave rectifier. A voltage divider formed by two resistors is connected between the two bus lines to provide a voltage. A thyristor controls the excitation current of a field winding of the generator, as in the present invention. The field winding of the generator constitutes the load to be controlled by the thyristor, also as in the present invention. The gate circuit, via which the thyristor is fired, includes a capacitor whose voltage, acting through a transistor and an auxiliary transistor, determines the firing time of said thyristor. The capacitor is connected in series with a resistor across the main path of the thyristor, so that the charging of the capacitor is determined by the blocking voltage of the thyristor. The emitter-collector path of a control transistor is connected in parallel with the capacitor. The base of the control transistor is connected through a Zener diode to the tap of the voltage divider so that said control transistor is controlled by the voltage output of said voltage divider. The base electrode of the first-mentioned transistor is connected through a resistor to the capacitor. When such first-mentioned transistor is in its conductive condition, a voltage drop occurs across a resistor connected in the collector circuit of said first-mentioned transistor. The voltage drop across the last-mentioned resistor displaces the voltage at the base electrode of the auxiliary transistor to such an extent that said auxiliary resistor is switched to its conductive condition and supplies a control current to the gate of the thyristor. The thyristor is fired to its conductive condition by the control current from the auxiliary transistor and conducts excitation current passing through the field winding of the generator.

A particular advantage afforded by the novel control of the thyristor 8 is the fact that, independently of the condition of this thyristor, the turn-off circuit becomes effective once during each period. At high rotating speeds of the generator or at high frequencies, the current in the excitation winding 3 or in any other load member located in the thyristor-controlled direct-current circuit may be determined predominantly or almost exclusively by the continually reversing charge of the capacitor 14.

In cases where this current must be expected to assume excessively high values, an additional auxiliary device, operating for example with transistors, may be provided for suppressing the firing pulse for the auxiliary thyristor 12. Preferably the suppression is made effective only when the main thyristor 8 is turned off. Such suppression under conditions of excessive current acts upon the control or regulating performance in the sense of reducing the current in winding 3 toward zero. It is possible in this manner to utilize the available alternating voltage for feeding the excitation winding under on-off control, without accessory keying or monitoring means, with a very simple design of the turnoff circuit. Such a system affords adjusting the excitation current from a maximum value down to one-third or one-sixth virtually without steps.

To those skilled in the art, it will be obvious upon a study of this disclosure, that my invention is amenable to various other modifications and hence can be given embodiments other than those particularly illustrated and described herein, without departing from the essential features of my invention and within the scope of the claims annexed hereto.

I claim:

1. A direct-voltage control system for supplying rectified voltage from three-phase alternating voltage, comprising a three-phase alternating-voltage feeder, a rectifier connected to said feeder and having positive and negative output leads, a load circuit extending between said leads, a main thyristor having a main path series connected in said load circuit and having trigger means for intermittently firing said main thyristor, a commutating capacitor and an auxiliary thyristor connected in series with each other between the load side of said main thyristor and one phase of said alternating-voltage feeder for extinguishing said main thyristor, trigger means for firing said auxiliary thyristor to cause extinction of said main thyristor, and a diode connecting said capacitor with another one of said feeder phases whereby said capacitor is charged by the phase voltage between said feeder phases.

2. In a direct-voltage control system according to claim 1, said trigger means for said auxiliary thyristor comprising a pulse-generating circuit having a saturable transformer, said transformer having a secondary winding connected to the gate path of said auxiliary thyristor and having a primary winding connected between two phases of said feeder.

3. In a direct-voltage control system according to claim 1, said trigger means for said auxiliary thyristor comprising a pulse-generating circuit having a saturable transformer, said transformer having a secondary winding connected to the gate path of said auxiliary thyristor and having a primary winding of which one end is connected to said one feeder phase, and a resistor connecting the other end of said primary winding with the third phase of said feeder.

4. In a direct-voltage control system according to claim 1, said trigger means for said auxiliary thyristor comprising a saturable transformer having a primary winding connected between two of said feeder phases and having a secondary winding connected to the firing path of said auxiliary thyristor, and a diode connected in series between said secondary winding and said firing path.

5. A direct-voltage control system for supplying rectified voltage from three-phase alternating voltage, comprising a three-phase alternating-voltage feeder, a three-phase rectifier bridge network connected to the three phases of said feeder and having positive and negative output leads, a load circuit extending between said leads, a main thyristor having a main path series connected in said load circuit and having trigger means for intermittently firing said main thyristor, a commutating capacitor and an auxiliary thyristor connected in series with each other between the load side of said main thyristor and one phase of said alternating-voltage feeder for extinguishing said main thyristor, a diode connecting said capacitor with another one of said feeder phases whereby said capacitor is charged by the phase voltage between said feeder phase and a trigger-pulse generating circuit having a saturable transformer with primary and secondary windings, said primary winding being connected between two of said feeder phases, and a diode connected in series with said secondary winding to the firing path of said auxiliary thyristor.

6. A system for regulating the voltage of a three-phase generator having an excitation winding and three-phase output terminals, comprising a three-phase rectifier bridge network connected to said three terminals and having positive and negative output leads, a load circuit extending between said leads and comprising said excitation winding and a free-wheeling diode shunt-connected with said winding, a main thyristor having a main path series connected in said load circuit and having trigger means for intermittently firing said main thyristor, a commutating capacitor and an auxiliary thyristor connected in series with each other between the winding side of said main thyristor and one of said generator terminals for extinguishing said main thyristor, a diode connecting said capacitor with another one of said generator terminals and having a negative diode lead attached to the capacitor side connected with said auxilry thyristor whereby said capacitor is charged by the phase voltage between said terminals, and trigger means for firing said auxiliary thyristor to turn off said main thyristor.

References Cited

UNITED STATES PATENTS

| | | | |
|---|---|---|---|
| 2,789,253 | 4/1957 | Vang | 317—11 |
| 3,137,811 | 6/1964 | Kirk | 322—28 |
| 3,209,234 | 9/1965 | Bridgeman | 322—28 |
| 3,209,236 | 9/1965 | Bridgeman | 322—28 |
| 3,299,303 | 1/1967 | Newill | 322—28 X |
| 3,309,570 | 3/1967 | Goldberg | 317—11 |

LEE T. HIX, *Primary Examiner.*

R. V. LUPO, *Assistant Examiner.*